United States Patent [19]

Kerst et al.

[11] 4,252,609
[45] Feb. 24, 1981

[54] CROSSED-FIELD DIVERTOR FOR A PLASMA DEVICE

[75] Inventors: Donald W. Kerst; Edward J. Strait, both of Madison, Wis.

[73] Assignee: The United States of America as represented by the United States Department of Energy, Washington, D.C.

[21] Appl. No.: 963,655

[22] Filed: Nov. 24, 1978

[51] Int. Cl.³ .............................................. G21B 1/00
[52] U.S. Cl. ...................................................... 176/9
[58] Field of Search ................................... 176/1, 3, 9

[56] References Cited

U.S. PATENT DOCUMENTS

| 2,868,991 | 1/1959 | Josephson et al. | 176/3 |
| 3,441,775 | 4/1969 | Hammel et al. | 176/3 |
| 4,149,931 | 4/1979 | Christensen | 176/9 |

OTHER PUBLICATIONS

CONF-750905-P1, 9/75, p. 139, Consoli et al.
Nuclear Fusion, Special Suppl., 1974, pp. 17-25, Tenney.
J. of Nuclear Materials, vol. 63, 1976, pp. 91-95, McCracken.
Nuclear Fusion, vol. 16, No. 1, 2/76, pp. 148, 149, Maeda et al.
UWFDM-68, vol. 1, 3/74, pp. (III-A-1)-(III-A-3), (III-B-1)-(III-B-3), (III-D-1)-(III-D-4).
Trans. ANS, 6/77, pp. 508, 509.

*Primary Examiner*—Harvey E. Behrend
*Attorney, Agent, or Firm*—James E. Denny; Frank H. Jackson; Donald P. Reynolds

[57] ABSTRACT

A divertor for removal of unwanted materials from the interior of a magnetic plasma confinement device includes the division of the wall of the device into segments insulated from each other in order to apply an electric field having a component perpendicular to the confining magnetic field. The resulting crossed-field drift causes electrically charged particles to be removed from the outer part of the confinement chamber to a pumping chamber. This method moves the particles quickly past the saddle point in the poloidal magnetic field where they would otherwise tend to stall, and provides external control over the rate of removal by controlling the magnitude of the electric field.

5 Claims, 1 Drawing Figure

U.S. Patent
Feb. 24, 1981
4,252,609
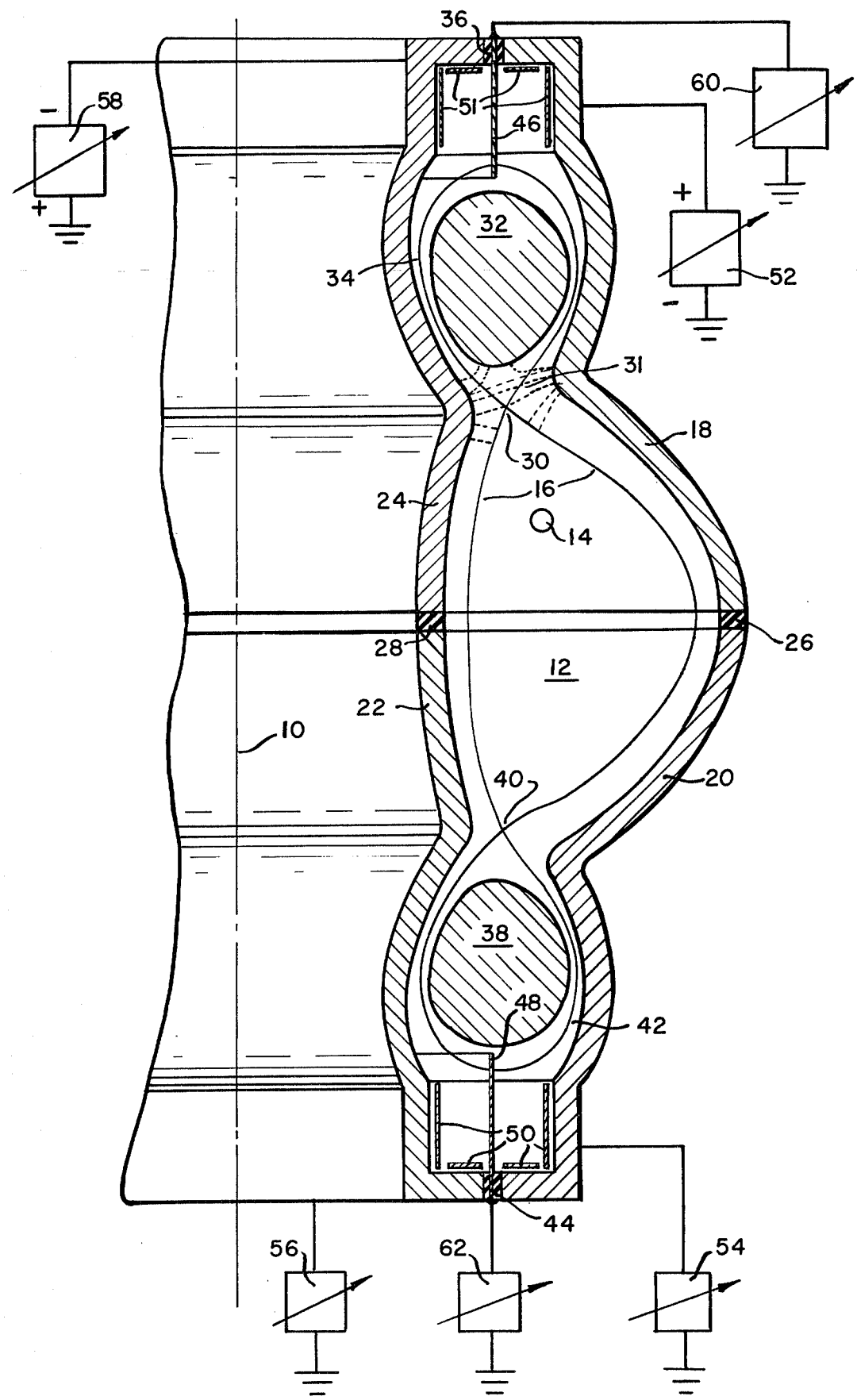

CROSSED-FIELD DIVERTOR FOR A PLASMA DEVICE

CONTRACTUAL ORIGIN OF THE INVENTION

The invention described herein was made in the course of, or under, a contract with the United States Department of Energy.

BACKGROUND OF THE INVENTION

This invention relates to plasma devices. In particular, this invention is a divertor for removal of unwanted charged particles from a plasma.

A noticeable feature of most models both built and proposed for plasma systems is some form of divertor. This is an apparatus that operates to remove unwanted particles from the plasma while interfering as little as possible with the maintenance of the plasma. The unwanted particles may be impurities that are sputtered from the walls of the plasma device or they may be escaping hot particles which would bombard the wall in the case of a plasma device that is intended to be some form of a reactor. In either case, the unwanted particles tend to cool the plasma by their presence and it is desirable to remove them from the plasma to maintain the plasma in a desired state. This is a particular problem in the Tokamak which is a plasma device in which the plasma is confined in a toroidal region by a combination of magnetic fields that are toroidal and poloidal. The term "poloidal" refers to magnetic fields in the plasma region that are in a plane containing the axis of the toroid. These fields contribute to the stability of the plasma. It is well known that a plasma in a purely toroidal field configuration is not stable. The addition of a carefully calculated poloidal field provides the stability that is a principal feature of the Tokamak. This is accomplished by creating a pattern of magnetic flux lines in the center of the plasma region that adds to the magnetic flux that is applied to confine the plasma in the toroid and also to the magnetic flux generated by the plasma itself to create an average minimum of magnetic field within the plasma or to create shear in the field. Such an average minimum serves as a collection region both for particles of the plasma and for unwanted charged particles, the impurities described above.

Early attempts at removing unwanted particles from plasmas were characterized by divertors such as those used on the Stellarator, an early twisted toroidal plasma device. Divertors on the Stellarator applied a small opposing magnetic flux near the outside of the twisted toroid to bend some of the outer toroidal flux lines in a loop. That loop was passed through an enclosure that included a collecting surface. Charged particles that were free to travel along the outer flux lines were trapped on the collecting surface and thereby removed from the plasma. However, the divertor in the Stellarator distorted the confining magnetic fields. An ideal divertor would not perturb or destroy the symmetry of the confining magnetic fields of the plasma device and would promote the quick removal of particles from the plasma edge.

It is an object of the present invention to provide a divertor for a plasma confinement system such as a Tokamak.

It is a further object of the present invention to provide quick and controllable passage of particles out through the diverter region.

It is a further object of the present invention to extract impurities from the plasma in a plasma confinement system such as a Tokamak by the use of crossed fields.

It is a further object of the present invention to extract impurities from a plasma without perturbing confining magnetic fields.

Other objects will become apparent in the course of a detailed description of the invention.

SUMMARY OF THE INVENTION

A divertor for removal of charged impurities from the plasma of a Tokamak or similar toroidal plasma device comprises means for dividing the walls of the container of the plasma into a number of sections of electrical conductors that are biased alternately with respect to each other and that are separated by gaps substantially on the equator of the toroid and within a pair of appendages to the walls. A pair of divertor openings is located about 90° from the gaps as seen on a cross section of the toroid that contains the axis of the toroid thus connecting the appendages to the device. The divertor openings are placed at saddles in the poloidal field that are created by a toroidal current-carrying elements enclosed within the appendages. A collector for the unwanted charged particles is placed within each appendage to remove the particles from the plasma for neutralizing and pumping to the exterior.

BRIEF DESCRIPTION OF THE DRAWING

The drawing is a cross section of a typical toroidal plasma device with the divertor of the present invention in operation.

DETAILED DESCRIPTION OF THE INVENTION

The drawing is a cross section of a toroidal plasma device illustrating the features of the divertor of the present invention. In the drawing, center line 10 is the major axis of a toroidal plasma device such as a Tokamak or the like. A plasma 12 is confined by a combination of magnetic fields in a shape that is substantially toroidal about axis 10. The main confinement fields of the plasma are indicated by the toroidal flux lines 14 that are constant along any circle centered on axis 10 and in a plane perpendicular to axis 10. Such flux lines 14 exhibit a variation that is inverse with radius from axis 10. Stability of the plasma 12 is maintained by the application of a poloidal magnetic field that is indicated in the FIGURE by poloidal flux lines 16. Poloidal flux lines 16 are the outer flux lines that are taken arbitrarily to define the outer edge of the plasma. As in a conventional diverter, poloidal flux lines outside the one labeled 16 leave the confinement chamber, and particles near the wall will eventually follow them to collectors 46 and 48.

The present invention is characterized by the following features that differ from the typical toroidal plasma device. First, the containing walls of the plasma device are segmented into first segment 18, second segment 20, third segment 22 and fourth segment 24. First segment 18 is separated from second segment 20 by an insulated gap 26. Similarly, third segment 22 is separated from fourth segment 24 by an insulated gap 28. A saddle 30 is created in the poloidal flux by a toroidal current carrier 32. First segment 18 and fourth segment 24 are curved into an appendage to enclose current carrier 32 and flux line 34 that represents the extension through saddle 30 of poloidal flux lines 16. First segment 18 is insulated from fourth segment 24 by insulator 36. A comparable arrangement is formed by current carrier 38 which generates saddle 40 in poloidal flux lines 16. Second segment 20 and third segment 22 are curved into an appendage to enclose flux line 42 and are insulated from each other by insulator 44. Collector 46 intersects closed flux line 34 and collector 48 is disposed similarly with respect to flux line 42. Collectors 46 and 48 may be biased with respect to the potential in plasma 12 and constructed both to condense and to remove particles. Segments 18, 20, 22 and 24 are biased alternately with respect to each other.

Consider the saddle 30. The poloidal flux is zero at this point and the toroidal flux is directed perpendicular to the plane of the cross section that is represented by the FIGURE. With a voltage applied between first segment 18 and fourth segment 24, an electric field will exist at saddle 30 that is directed substantially radially with respect to axis 10. Typical lines 31 of electric flux show typical directions of that field, especially at saddle 30 and at poloidal flux lines 16 which define the outer edge of the plasma. It is well known that when an electric field E is perpendicular to a magnetic field B, a charged particle in the presence of those fields is subjected to a drift in a direction perpendicular to both fields. This is referred to as the E×B ("E cross B") drift. That drift, due to the applied E field and the toroidal B field, will cause charged particles from the plasma to be driven through saddle 30 and along flux lines 34, 42 to where they can be collected by collector 46. This accomplishes the divertor action that is desired. A comparable effect exists with another E cross B drift at saddle 40 that directs charged particles into a region where they can be collected by collector 48. This accomplishes divertor action by attracting unwanted charged particles from the plasma. The diverter action has three other advantages. First, the plasma is essentially undistorted by the divertor since it is only the outer flux lines that are affected by the electric field, which is shielded out of the central plasma. A second advantage is that the speed of removal of particles is controllable externally by adjusting the voltage between segments 18 and 24, hence the strength of the E field. A third advantage is that the E cross B drift reaches for some distance into plasma 12 to divert particles from plasma 12 and to drift them across the saddle. This is in contrast to the usual divertor which leads particles outward generally along magnetic field lines, and since these lines stall at the saddle, particles would have a tendency to accumulate there instead of being swiftly removed to the collector. A fourth advantage is that impurities at the plasma edge are swept by E×B drift toward saddles 30 and 40 for removal from the plasma.

The detailed structure of collectors 46 and 48 will in general be a function of the makeup of plasma 12 and will be affected by the objective for which the plasma device has been designed. In the case of a research plasma device in which the major contaminant is likely to be heavy particles sputtered from the walls, it could be expected that the sputtered particles will be ionized in plasma 12 and that they will be sputtered or vapor-deposited on collectors 46 and 48 when the particles strike collectors 46 and 48 and are neutralized electrically. If the plasma 12 is a fusion plasma and it is desired to use the divertor to remove unconsumed fuel particles, then it might be desirable in addition to cool collectors 46 and 48 to trap particles that have been removed from plasma 12 by the action of the crossed fields. The cooling mechanism for collectors 46 and 48 is not shown because that is beyond the scope of the present invention. It is likely, however, that almost any such divertor of particles will operate better if the region of particle collection is pumped by one or more cryopumps 50 and 51. These pumps will assist in maintaining a vacuum in a region of the plasma device that is subject to continual outgassing by particle bombardment from the diverted particles.

The drawing also shows an arrangement for establishing biases that provides a considerable amount of flexibility in the operation of the cross field diverter. First segment 18 is connected to a first voltage source 52, second segment 20 is connected to second voltage source 54, third segment 22 is connected to a third voltage source 56, and fourth segment 24 is connected to a fourth voltage source 58. Collector 36 receives a bias voltage from first bias source 60 and collector 48 receives its bias from a second bias source 62. Each of the sources 52 through 62 is shown as adjustable for maximum flexibility in adjusting the electric field of the E×B drift and for attracting the charged particles that are driven from the plasma by the E×B drift and continue on the extensions of poloidal flux lines 16 that are represented by flux lines 34 and 42. Individual adjustments of these voltage sources would be of use in tuning a plasma device for operation.

An examination of the FIGURE will show that the conditions described above for divertor action apply in reverse in the vicinity of gaps 26 and 28. The voltages applied to the walls of the plasma device will generate electric fields in the plane of the cross-section, with vertical components, and there will be components of the combined toroidal and poloidal magnetic fields directed perpendicular to the plane of the FIGURE. The result is to generate an E×B drift into the plasma. This is of no concern as long as there is no supply of charged particles near gaps 26 and 28 to drift into the plasma. It would also be possible to use this effect, characterized as "anti-divertor" action, to inject charged particles into the plasma across the confining lines of magnetic flux.

While the preferred embodiment of the invention has been described in terms of a Tokamak plasma device, it should be obvious that the scope of the invention is broad enough to include other plasma devices. All that is necessary is that there be a combination of components of static electric and magnetic fields that are perpendicular to each other and directed away from the plasma in a region near the edge of the plasma. Particles removed by the resulting E×B drift must then be prevented from returning to the plasma. It is also possible to achieve the objects of the invention by placing false walls inside the outer walls of the plasma device. Such false walls can be insulated from each other and from the outer walls to allow control of the divertor electric field by adjusting voltages on the false walls which leaving the outer walls grounded. Such construction, however, is not preferred since additional problems of erosion and impurity generation must be then resolved.

What we claim is:

1. A divertor for a device for containing a plasma, the divertor comprising:
   an electrically conductive containing wall having a plurality of poloidally spaced-apart segments;

a first segment of said containing wall disposed outside the plasma and insulated electrically from electrical ground;

a second segment of said containing wall disposed outside the plasma and disposed with respect to the first segment to form a gap at an entrance to the divertor that is substantially parallel to a bounding surface of the plasma, the second segment insulated electrically from the first segment;

an electrical source connected electrically to said first and said second segments to establish an electric field between said first and second segments;

said first and said second segments of said containing wall energized by said electrical source to generate a static electric field at the bounding surface of the plasma, the electric field having a component substantially perpendicular to the bounding surface of the plasma and a component of the electric field directed on a line substantially parallel to the plasma at an entrance to the divertor;

means for generating a first static magnetic field at the bounding surface, the magnetic field having a component substantially parallel to the bounding surface of the plasma and perpendicular to the component of the electric field at the entrance to the divertor, the component of the magnetic field which is perpendicular to the component of the electric field being located in areas of the device which contain charged particle impurities so as to exert a drifting force thereon; and means for collecting the charged particles which drift away from the bounding surface of the plasma in response to said drifting force.

2. The divertor of claim 1 wherein the means for generating a static magnetic field comprise currents circulating in the plasma.

3. A divertor for a toroidal device of the Tokamak type to contain a plasma and having toroidal and poloidal magnetic, the divertor comprising:

means for producing a saddle in the poloidal field;

an electrically conductive containing wall having a plurality of poloidally spaced-apart segments;

a first segment of said containing wall disposed outside the plasma and insulated electrically from ground;

a second segment of said containing wall disposed outside the plasma and adjacent to said first segment so as to form a gap at the saddle, the second segment insulated electrically from the first segment and from ground;

means connected to the first and second segments for applying an electric potential therebetween to establish the electric field at the saddle; and said first and said second segments of said containing wall energized by said electrical potential means to produce at the saddle an electric field which is substantially parallel to and clear of a surface of the plasma and which is substantially perpendicular to the toroidal magnetic field such that a vector cross-product of the electric field and the toroidal magnetic field at the saddle is non-zero, is directed away from the plasma, and exerts a force on charged particle impurities located at the saddle; and means for collecting charged particle impurities that drift from the plasma in response to the non-zero value of the vector cross-product.

4. The divertor of claim 3 wherein the means for producing a saddle in the poloidal field comprise a substantially toroidal electric conductor disposed outside and parallel to the plasma and carrying an electric current chosen in magnitude and direction to oppose the poloidal magnetic field.

5. The divertor of claim 5 wherein the means for collecting charged particles comprises:

a plate disposed outside the plasma to intercept lines of magnetic flux passing the saddle; and an electrical source connected to the plate and to electrical ground to apply to the plate a voltage with respect to ground.

* * * * *